US007886657B2

(12) United States Patent
Nothum, Jr.

(10) Patent No.: US 7,886,657 B2
(45) Date of Patent: Feb. 15, 2011

(54) INTEGRATED COMPACT FOOD PROCESS LINE AND PROCESS

(76) Inventor: Robert G. Nothum, Jr., 6356 W. State Hwy. O, Willard, MO (US) 65804

( * ) Notice: Subject to any disclaimer, the term of this patent is extended or adjusted under 35 U.S.C. 154(b) by 1392 days.

(21) Appl. No.: 11/359,879

(22) Filed: Feb. 22, 2006

(65) Prior Publication Data

US 2006/0207436 A1    Sep. 21, 2006

Related U.S. Application Data

(63) Continuation-in-part of application No. 11/063,339, filed on Feb. 22, 2005, now abandoned, which is a continuation of application No. 10/961,476, filed on Oct. 8, 2004, now abandoned, which is a continuation of application No. 10/837,503, filed on Apr. 30, 2004, now abandoned, which is a continuation of application No. 10/680,558, filed on Oct. 6, 2003, now abandoned, which is a continuation of application No. 10/457,032, filed on Jun. 6, 2003, now abandoned.

(60) Provisional application No. 60/386,822, filed on Jun. 7, 2002.

(51) Int. Cl.
*A23B 4/52* (2006.01)

(52) U.S. Cl. .................... 99/352; 99/357; 99/360

(58) Field of Classification Search .............. 99/352, 99/357, 360
See application file for complete search history.

(56) References Cited

U.S. PATENT DOCUMENTS

| 3,738,313 | A | 6/1973 | Heim | 118/16 |
|---|---|---|---|---|
| 4,191,881 | A | 3/1980 | Ahlgren et al. | 219/388 |
| 4,508,025 | A | 4/1985 | Schultz | 99/353 |
| 5,552,172 | A * | 9/1996 | Liebermann | 426/232 |
| 5,937,744 | A | 8/1999 | Nothum, Sr. et al. | 99/494 |
| 6,158,332 | A | 12/2000 | Nothum, Sr. et al. | 99/494 |
| 6,305,274 | B1 | 10/2001 | Nothum, Sr. et al. | 99/404 |
| 6,367,371 | B1 | 4/2002 | Ni | 99/348 |
| 2005/0092014 | A1 | 5/2005 | Nothum, Jr. | |
| 2005/0092730 | A1 | 5/2005 | Nothum, Jr. | |

FOREIGN PATENT DOCUMENTS

WO    WO0241715    5/2002

OTHER PUBLICATIONS

EP Extended European Search Report, Appln. No. EP 06 003 623.3 Date of Mailing: May 11, 2006.

* cited by examiner

*Primary Examiner*—Shawntina Fuqua
(74) *Attorney, Agent, or Firm*—Jonathan A. Bay

(57) ABSTRACT

A cellularly-integrated food process line (30) is a combination of several diverse cells (32, 24, 36, 38), which are diverse because each performs non-identical operations. Such cells (32, 24, 36, 38) are configured to perform at least one sub-process as marinade, form, cook, dust coat, batter coat, crumb coat, fry, sear, grill mark or freeze, as well as any two or several of those sub-processes in combination. The cells (32, 24, 36, 38) are also configured to stack vertically in interchangeable combinations, as desired, to form a tower. Changing the combination or sequence of such cells (32, 24, 36, 38) correspondingly changes the end result on food product (41) processed by such combination. Each cell has its own conveying apparatus (56, 60, 68) for motivating food product (41) along a pathway, which may collectively be driven by a common drive system (40, 50).

10 Claims, 15 Drawing Sheets

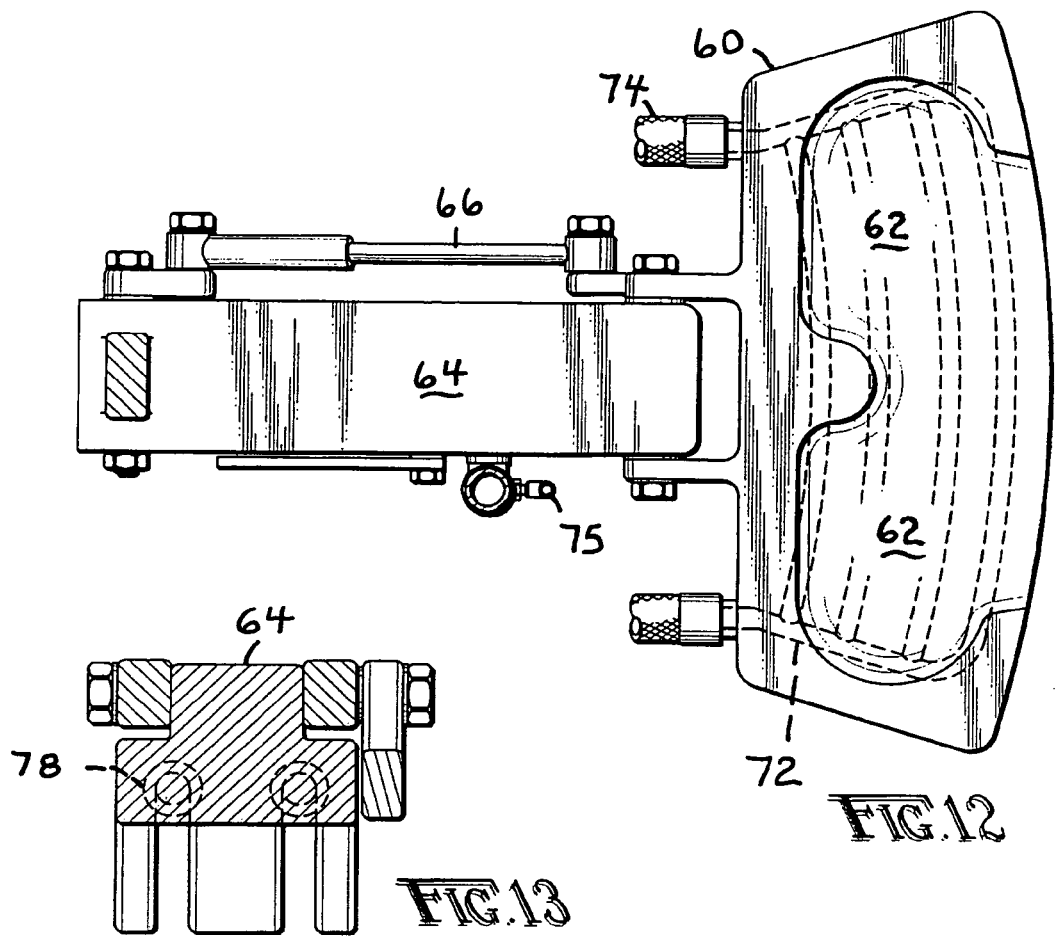
FIG.12
FIG.13
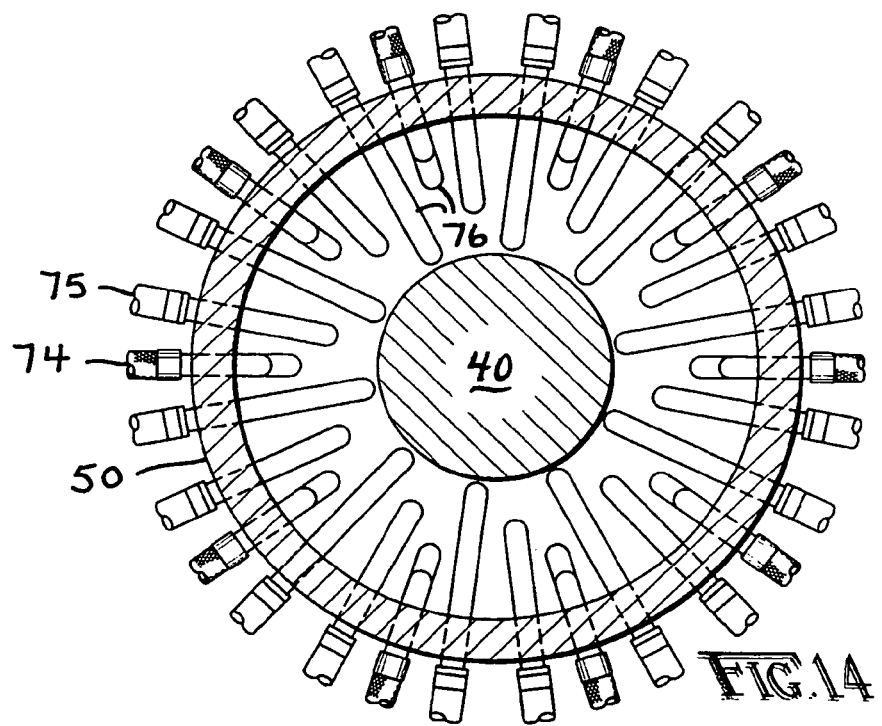
FIG.14

INTEGRATED COMPACT FOOD PROCESS LINE AND PROCESS

CROSS-REFERENCE TO RELATED APPLICATION(S)

This application is a continuation-in-part of U.S. patent application Ser. No. 11/063,339, filed Feb. 22, 2005, now abandoned which is a continuation of U.S. patent application Ser. No. 10/961,476, filed Oct. 8, 2004, now abandoned which is a continuation of U.S. patent application Ser. No. 10/837,503, filed Apr. 30, 2004, now abandoned which is a continuation of U.S. patent application Ser. No. 10/680,558, filed Oct. 6, 2003, now abandoned which is a continuation of U.S. patent application Ser. No. 10/457,032, filed Jun. 6, 2003, now abandoned which claims the benefit of U.S. Provisional Application No. 60/386,822, filed Jun. 7, 2002, which was originally presented as U.S. Provisional Application No. 60/297,402, filed Jun. 11, 2001. All the foregoing patent applications are fully incorporated herein by reference.

BACKGROUND AND SUMMARY OF THE INVENTION

The invention generally relates to large scale food process lines of the type having a series of machines or stations arranged together and performing distinct processes on articles of food product for ultimately producing packaged and frozen food product. The frozen and packaged food product affords distribution to restaurant and/or consumer grocery stores and the like. For example and without limitation, in the case of frozen chicken strips for the fast food or consumer grocery stores, such a food process line might comprise the following stations in series:—a) pre-dust, b) batter, c) bread, d) batter (again), e) fry and freeze and package and so on.

Nowadays it is conventional for a large scale food process line to be arranged truly in a "line." That is, such a large scale food process line is put together with separate machines linked together in a linear chain to perform a chain of events. A typical line that might be as simple as pre-dust, batter, bread and fry might measure in consequence thirty to fifty feet (9 to 15 m) or more in length. It is also conventional that food-processing companies which purchase such equipment from manufacturers thereof usually specify processing rates in the thousands of pounds an hour (or thousands of kilos an hour).

There are shortcomings with the foregoing. Such process lines, because of their length, require being housed in a sizable building. Additionally, because of the high volume processing rates, utilization of such lines tends to deter innovation with trials of new food products, which trials would preferably be conducted on a much smaller scale of volume.

Given the foregoing, the invention more particularly relates to an integrated food line which accomplishes much of the same work as accomplished by the known large scale food process lines except by an integrated apparatus which is also scaled to a relatively more compact size.

Therefore, it is one object of the invention to reduce the amount of floor space required for installation of a food process line.

It is an alternate object of the invention to provide a cellular construction which allows custom selection from a diverse set of cells to be combined at will for custom results.

It is another object of the invention that such diverse cells combine together in a compact package by way of combining by vertically-stacking. That way, the choice of how many cells to include or exclude has little affect on the "footprint" (eg., floor space requirement) of the combined cells. To consider this in reverse, if a cramped floor space will accommodate at least one cell, then it should accommodate several and otherwise not be a limiting factor on how many cells can be selected.

It is an additional object of the invention to treat or process food pieces individually, in contrast to collectively in mass, for various if not all the sub-processes or stages of the custom-designed food process task.

It is a further object of the invention to eliminate belting in particular target areas (eg., as compressed between both a carrying and submerging conveyor through a bath of frying oil) because, among other shortcomings, belts tend to crush desirably large (bread) crumbs.

It is still another object of the invention to bring new physical processes, data collection and control to food processing.

Given the foregoing, these and other aspects and objects are provided according to the invention in a compact cellular food process line comprising a plurality of diverse cells. Each cell includes conveying apparatus that extends between an infeed zone for introduced food product and a discharge zone to where the introduced food product is conveyed along a pathway therefor and discharged therefrom. Each cell further includes process apparatus for interacting with the food product along the pathway thereof to achieve at least one sub-process comprising any of marinade, form, cook, dust coat, batter coat, crumb coat, fry, sear, freeze and so on.

Preferably a custom arrangement for such a compact cellular food process line in accordance with the invention is put together by a user selecting at least a first and a second of such cells, which at least first and second cells are presumptively diverse from each other according to the sub-processes thereof. Said at least first and second such cells are combined in a vertical stack such that the pathway of the second cell generally courses under the pathway of the first cell.

Optionally, either the first cell feeds the second or conversely. Preferably, however, the first cell feeds the second. That way, food product is always descending when transferring between cells.

The vertical stack will accept, needless to say, the inclusion of third or higher number cells and is not limited to just a first and second selected cell. Thus, the vertical stack can readily include a third of such cells, which is presumptively diverse according to the sub-processes of the others, and which is combined in the vertical stack such that the pathway of the third cell generally courses under the pathway of the second cell. Again, preferably the second cell feeds the third.

It is possible that a three-cell vertical stack can be taken apart, re-arranged and then put back together such that, for example, what the second and third cells swap places. For convenience of reference, it is preferred to refer to the cells by their "present" descending order in the stack, such that the "first" cell refers to the top cell, the "second" cell refers to the penultimate cell, the "third" cell refers to the ante-penultimate cell, and so on.

It is an aspect of the invention that any such cell of the vertical stack is replaceable therein with a diverse replacement cell for said stack. It is preferred if each cell's pathway generally traces a lap or substantial portions thereof about a circuit in a generally horizontal plane. It is more preferential still that each cell's pathway generally traces a circle or circular arc about a generally vertical central axis. That way, any train of carts or the like on any cell's pathway makes endless laps around the circuit.

It is desired that the compact cellular food process line in accordance with the invention includes a driven vertical axle (or spindle). Hence circular cells in accordance with the invention are arranged around the vertical axle like rings around a post. The vertical axle can be driven in rotation, and thus the conveying apparatus of certain ones of the cells can coupled to the vertical axle to harness its drive power.

It is an aspect of the invention that certain cells might multi-task or at least perform two of the above-identified sub-processes. For example, it is preferred if one such cell is configured to undertake both a sub-process of forming in combination with either a sub-process of cooking or freezing. One way to achieve the foregoing is to configure the conveying apparatus therefor as a train of clamshell carts. Such clamshell carts are serviced by power to be individually operative between open and shut extremes, such that the shut extreme applies a compressive force to achieve product-forming work. Moreover, each clamshell cart is furthermore serviced by thermal utilities comprising either a source of heat or a source of cooling. That is, the clamshell carts can be laced with heat exchanger lines through which flow either a hot medium for cooking or else a chill or freezing medium to chill or freeze the product.

The power and thermal utilities for such clamshell carts are preferably run along the vertical axle and connect to transitional-couplers (eg., rotational seals) in order to link up thereafter with fixed sources of power or thermal services.

One way to achieve inter-cell transfer of food product is to have the discharge zone of each relatively upper cell configured to discharge food product onto the infeed zone of the immediately lower cell by either being let to drop or being provided with a ramp to slide down.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 12 is a plan view taken in direction of FIG. 10's arrows XII-XII;

FIG. 13 is a section view taken along line XIII-XIII in FIG. 9;

FIG. 14 is a scaled down section view taken along line XIV-XIV in FIG. 11;

DETAILED DESCRIPTION OF THE PREFERRED EMBODIMENTS

The drawings depict one non-limiting example of an cellularly-integrated compact food process line 30 and process in accordance with the invention.

Figure 1:
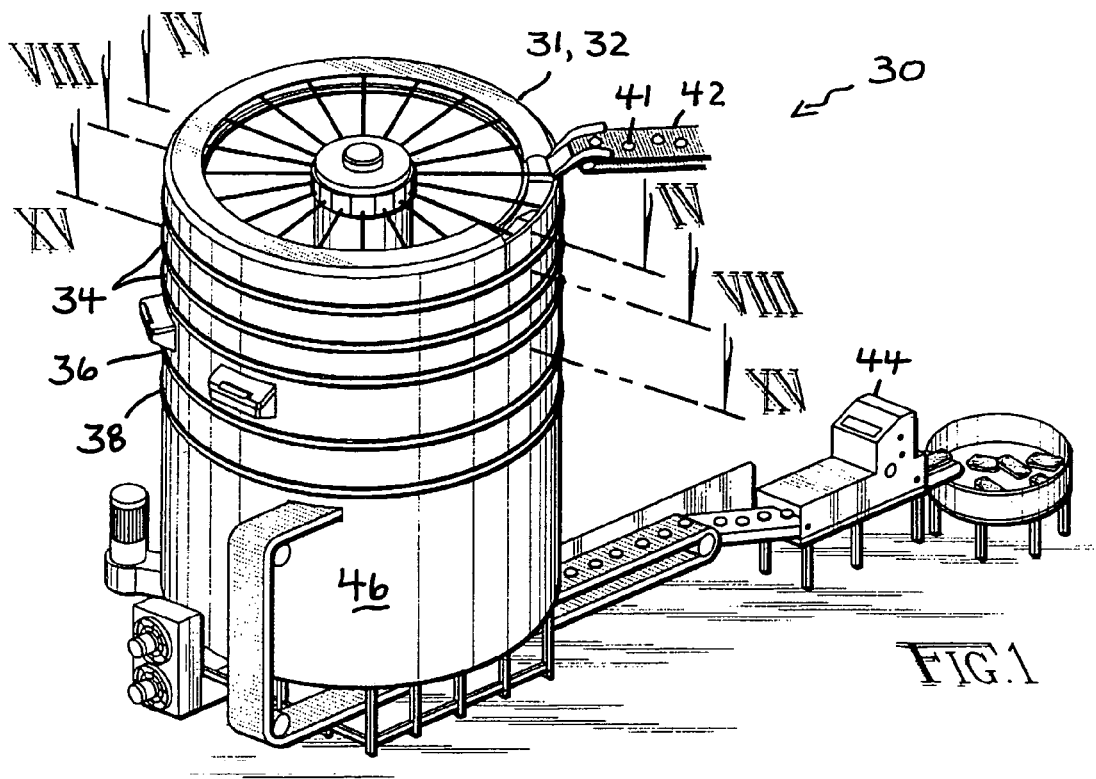
FIG. 1 is an overall perspective view of a cellularly-integrated compact food process line in accordance with the invention.

FIG. 1 shows that a preferred overall arrangement comprises a tower 31 assembled of variously interchangeable wheel-shaped cells 32, 34, 36 and/or 38 disposed around a central drive spindle 40.

In FIG. 1, individual pieces of food product 41 are introduced near the top of the tower 31 by an inflow belt 42 and discharged nearer the bottom to a packaging station 44. Whereas whole muscle products have an inherent form (eg., chicken drumsticks), much ground up product or mixes lack that and hence will accept being formed by forming processes to be more particularly described below. FIG. 1 shows the inflow belt 42 supplying by way of a non-limiting example dollops 41 of ground meat. The invention is suitable for processing a variety of input including without limitation ground meat for forming into meatballs or (hamburger) patties, whole muscle products which will not be formed including steaks or tenders, chunks including bacon, aggregates of chunks which might be formed including nuggets or sticks, and/or mixes for such end-results as crepes or pancakes.

In the present example shown by the drawings, it is assumed that there is at least a nozzle (not shown) discharging dollops 41 of product on the inflow belt 42. Some of the cells, as does at least the top cell 32 in view, have spokes 48 (or other things as described further on below) for motivating the food product 41 in circuits about the central spindle 40. The cells 32, 34, 36 and/or 38 can operate at different speeds. At least in this depiction of the invention, the freezer compartment 46 (eg., FIG. 19) is the base of the tower 31 and conveys food product 41 not in one lap around the spindle 40 but instead contains a helical (spiral) conveyor for carrying the product 41 around in several laps, as is known.

Figure 2:
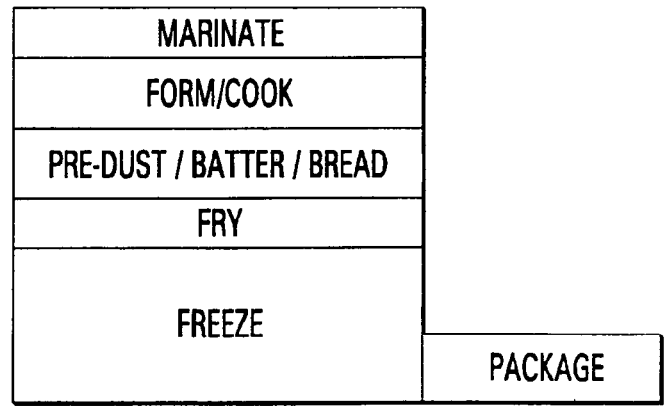
FIG. 2 is a side elevation schematic view thereof.
Figure 3:
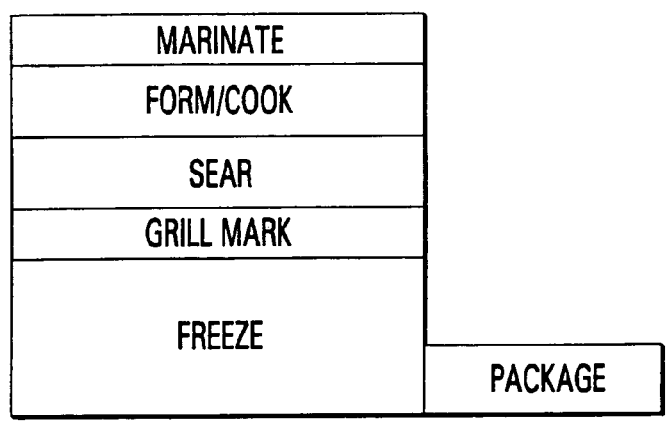
FIG. 3 is comparable to FIG. 2 except showing an alternative re-configuration.

FIGS. 2 and 3 are schematics showing the inventive aspect of interchangeability among various ones of the vertically-stacked cells. Briefly, each cell is designed to achieve at least one sub-process comprising any of marinade, form, cook, dust coat, batter coat, crumb coat, fry, sear, grill mark or freeze and the like, or any two or several of the sub-processes in combination. Hence FIG. 2 shows one optional combination of vertically-stacked cells for performing a sequence of sub-processes comprising marinate (eg., soak), form and cook (ie., as combined in one cell), dust coat/batter-coat/bread-coat as combined in one other cell (and, perhaps optionally including an intervening cell to undertake a second round of batter coat/bread-coat, but this is not shown), fry, freeze, and so on until the food product 41 is outputted, as to a packaging station 44.

This sequence of sub-processes optimizes the intention to cook some food products fully before coating and frying them. Generally, the cooking step before application of any coating makes the food product fit for human consumption, whereas the frying step following not only the coating steps but also the much earlier cooking step serves more to, not cook the food product but, set the coatings added after the cooking step. Put differently, whereas the step of cooking the uncoated product renders the raw food fit for human consumption, the later step of frying the cooked-and-coated product crispens the coatings, breading or batter and the like, more significantly for flavor's sake.

To turn to FIG. 3, it shows an alternative configuration (or in other words, a re-configuration) of the cellularly-integrated compact food process line 100' in accordance with FIG. 2. In FIG. 3, the selected re-combination of vertically-stacked cells perform a sequence of sub-processes comprising marinate (eg., soak), form and cook (ie., as combined in one cell), sear, grill mark, freeze, and so on until the food product is outputted, as to a packaging station 44. Hence, whereas FIG. 3 outputs what will appear to consumers as a traditional grilled hamburger patty, FIG. 2 in contrast outputs a dusted, battered and breaded patty (eg., something like a Salisbury steak).

Figure 4:
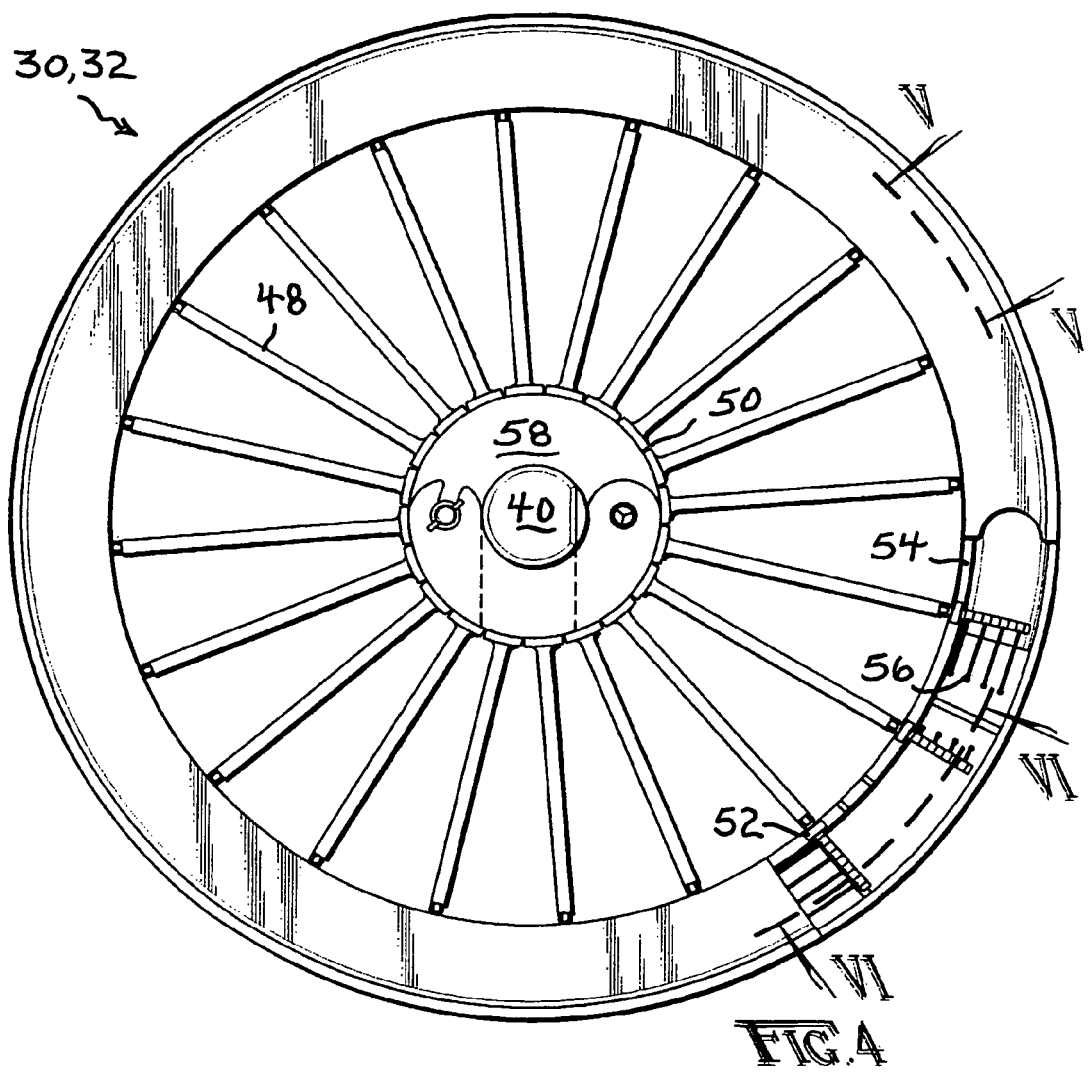
FIG. 4 is a scaled up plan view taken in the direction of FIG. 1's arrows IV-IV.
Figure 5:
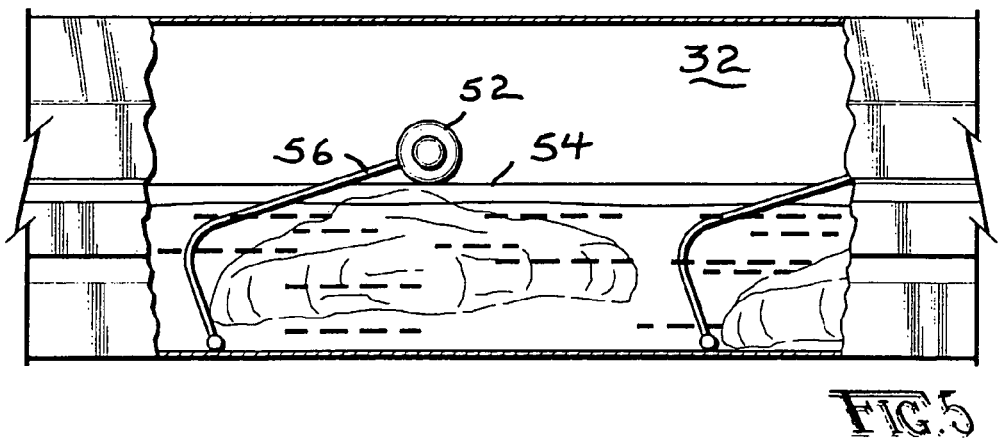
FIG. 5 is a scaled up elevation view taken in direction of FIG. 4's arrows V-V.

FIG. 4 is a plan view taken in the direction of arrows IV-IV in FIG. 1, whereas FIG. 5 is an elevation view taken in direction of arrows V-V in FIG. 4. Together FIGS. 4 and 5 show aspects of what optionally has been selected as the top cell 32 here, comprising a marination level. The marination cell 32 is centered around the central spindle 40. The marination cell 32 includes spokes 48 that have inner ends anchored in a hub 50 that is spaced away from the central spindle 40. The spokes 48 extend to outer rollers 52 for rolling on a cam ring 54, and terminate in abbreviated shafts which pull behind them bent fingers 56 for pushing product 41. In FIG. 4, the marination cell 32 has a locking arrangement 58 which keys into a keyway in the central spindle 40 for the transmission of drive power from the central spindle 40 to the marination cell 32. The locking arrangement 58 also opens up like scissors, so that the entire marination cell 32 can be removed or re-inserted by virtue of the locking arrangement 58 being opened apart and slid out, or slid back in and then closed shut.

Figure 6:
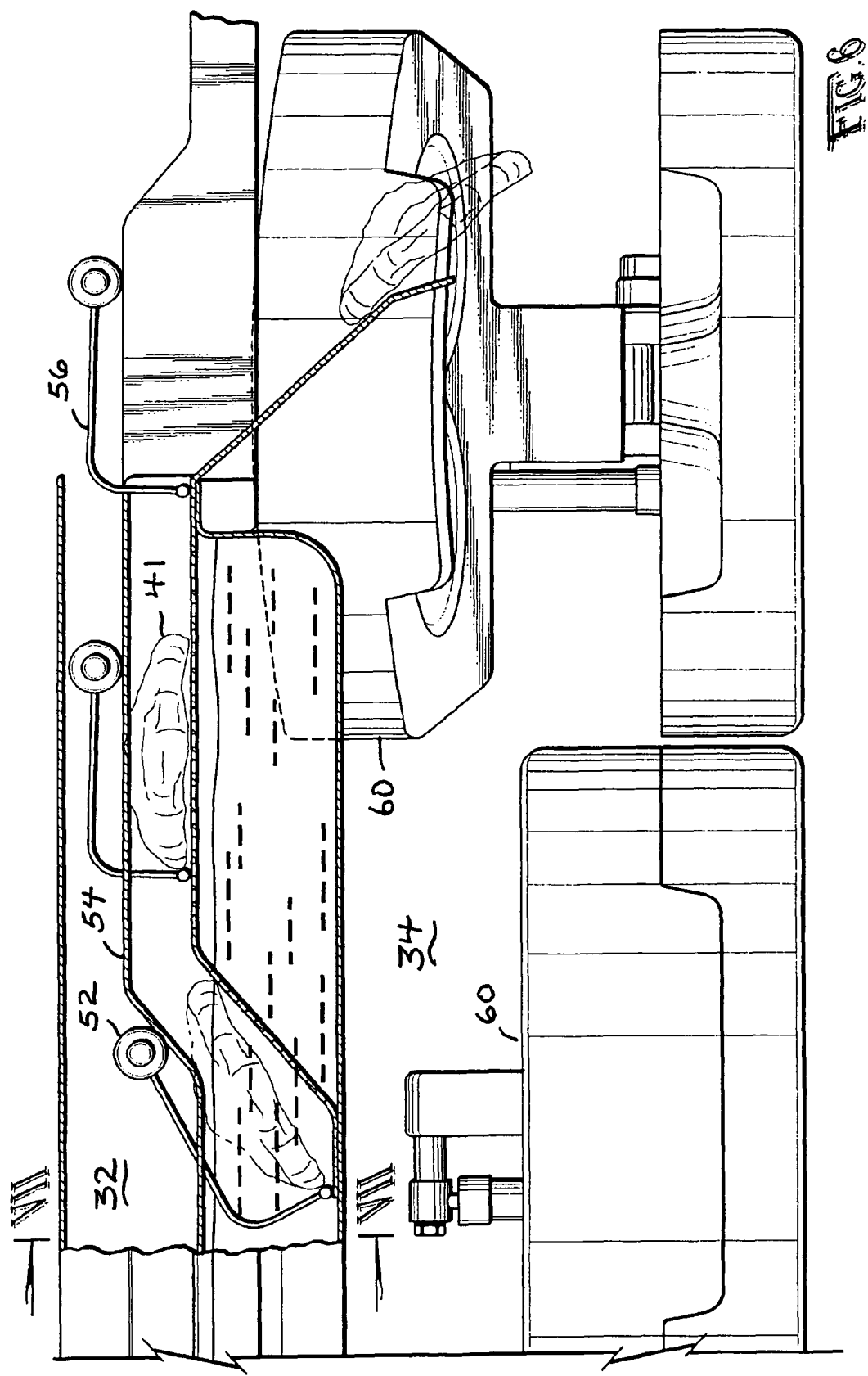
FIG. 6 is a scaled up elevation view taken in direction of FIG. 4's arrows VI-VI.

FIGS. 4 and 5 also show that the marination cell 32 further comprises a circular outer track provided with inner and outer bath walls in order to form a circular bath of marinade. FIG. 6 is an elevation view, partly in section, taken in direction of arrows VI-VI in FIG. 4. It shows lumpy product 41 being slid up a ramp out of the marination bath of the marination cell 32, over a perforated drain run, and dropped into the $2^{nd}$ cell 34 comprising form-and-cook operations.

The form-and-cook cell 34 comprises a train of clamshell carts 60 for ferrying the food product 41. The clamshell cart 60 in the right of FIG. 4 has its upper shell (lid) retracted up and is receiving a deposit of dropped-in lumpy product 41 in a leading one of two wells 62. The following clamshell cart 60 is shown shut. The clamshell carts 60 in the form-and-cook cell 34 rotate at same speed as spokes 48 in the marination cell 32. The form-and-cook cell 34 include spars 64 which serve as counterparts to the spokes 48 in the marination cell 32 as well as linkages 66 which both open and close each respective clamshell cart 60. In each clamshell cart 60, there are two deposit wells 62 for product 41.

Figure 7:
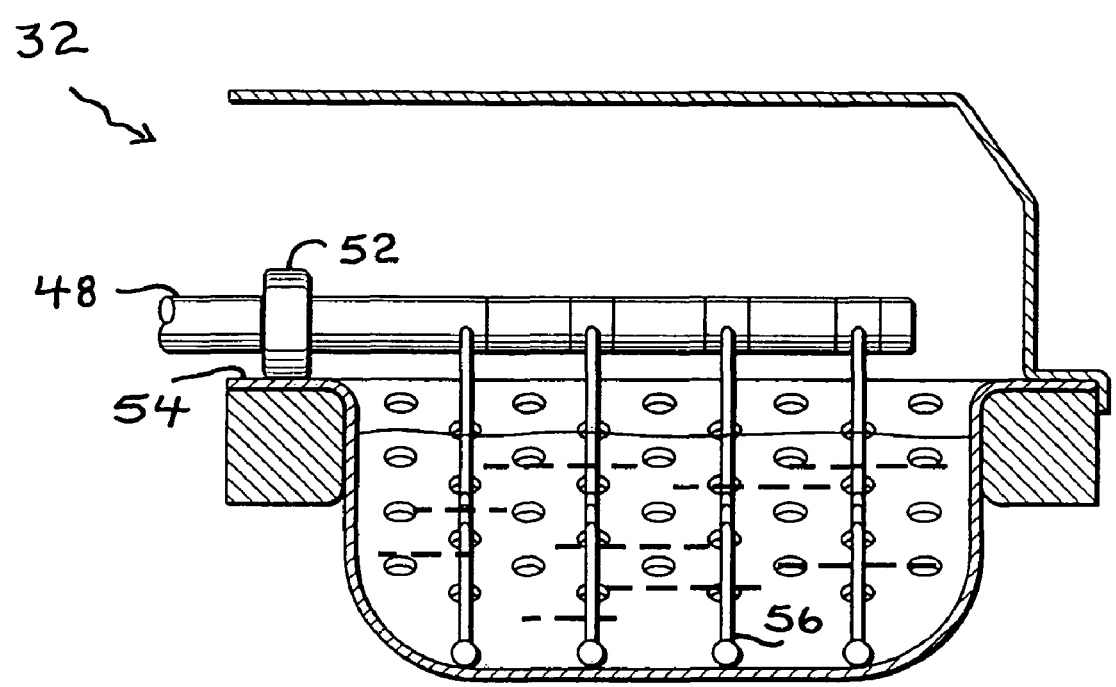
FIG. 7 is a scaled up section view taken along line VII-VII in FIG. 6.

FIG. 7 is a section view taken along line VII-VII in FIG. 6 and shows the perforated ramp for marinade that is draining off the re-emerged product 41 to drain through. The marinade bath is refreshed by outside utility connections in the form of flexible hoses (not shown). Such hoses can all be routed from the outside of the tower 31 (not shown). FIG. 7 also shows better the roller 52, the cam ring 54 on which the roller(s) 52 rides, and the fingers 56 pulled by the abbreviated shaft of the spoke 48. Whereas the spoke 48 (and its roller 52 and fingers 56) rotate about the central spindle 40 (not in view), the bath and ramp do not.

Figure 8:
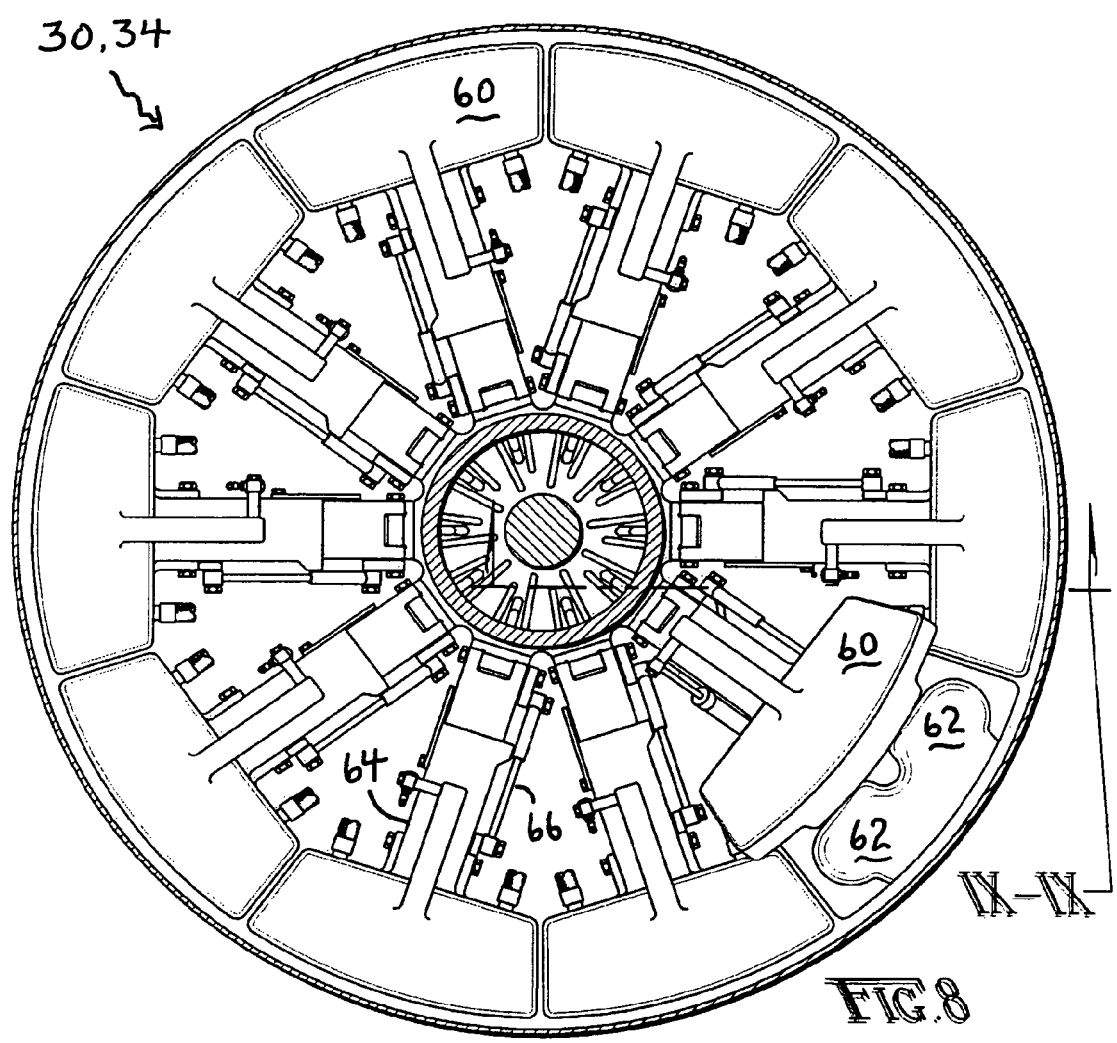
FIG. 8 is a scaled up section view taken along line VIII-VIII in FIG. 1.

FIG. 8 is a section view taken along line VIII-VIII in FIG. 1 and shows the $2^{nd}$ cell 34 comprising the form-cook operations as carried out by a train of ten or so clamshell carts 60, each comprising two product-receiving wells 62. Each forming-cooking clamshell cart 60 is sealable, with a thermal medium circulated through it, such as and without limitation hot oil, vapor or flue gas and the like. FIGS. 10 through 13 sequence through how the linkages 66 accomplish opening and closing the clamshell carts 60, as described in connection with those views. Preferably the linkages 66 are hydraulically-driven and controlled. These linkages 66 are driven with sufficient power that the shutting of the clamshell carts 60 compresses the lumpy (or compressible) product 41 into the form imposed by the shape of the wells 62, as in this example a flat circular patty.

Figure 9:
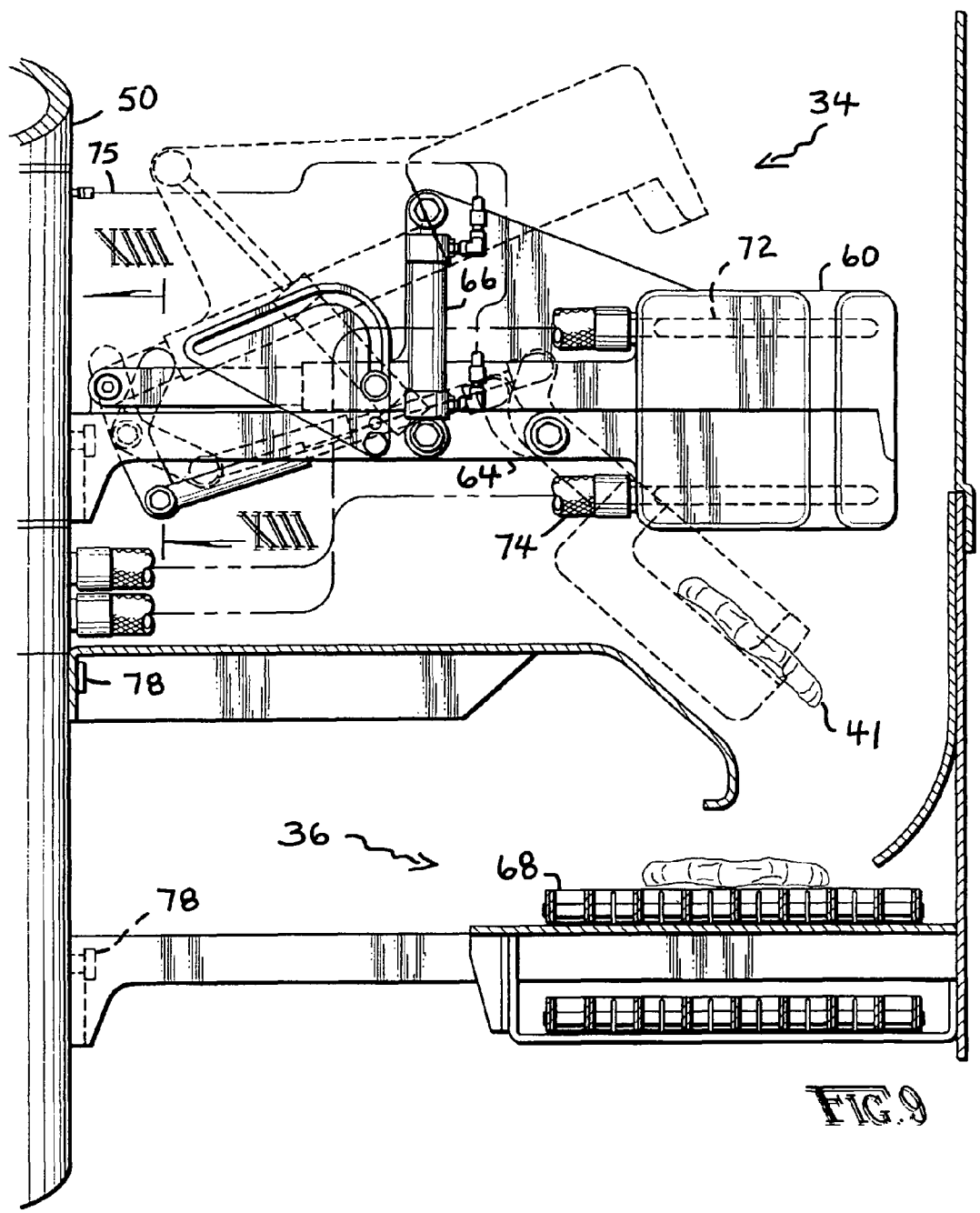
FIG. 9 is a scaled up section view taken along line IX-IX in FIG. 8.

FIG. 9 is a section view taken along line IX-IX in FIG. 8 and shows one such form-and-cook clamshell cart 60 in a shut position (ie., in solid lines). Dashed lines show various other movements for the clamshell cart 60 including a retracted upper shell (eg., lid) and a dropped or tipped down lower shell (eg., pan). These movements work independent of each other as will be shown next in the sequence of views comprising FIGS. 10 through 13. Staying in FIG. 9, it also shows formed (and cooked) product 41 being dropped from the form-and-cook cell 34 onto a carrying run of a conveyor 68 in the $3^{rd}$ cell 36, comprising coating operations (as will be described more particularly below in connection with FIGS. 15 through 17). FIG. 9 moreover shows that, immediately below the conveyor 68's carrying run, the conveyor 68 further comprises a return run. As mentioned, the sequence of operations with the coating cell 36 will be described more particularly below with FIGS. 15 through 17. But instead of jumping to FIG. 15, pause can be taken now to look more closely at FIGS. 10 through 14.

Figure 10:
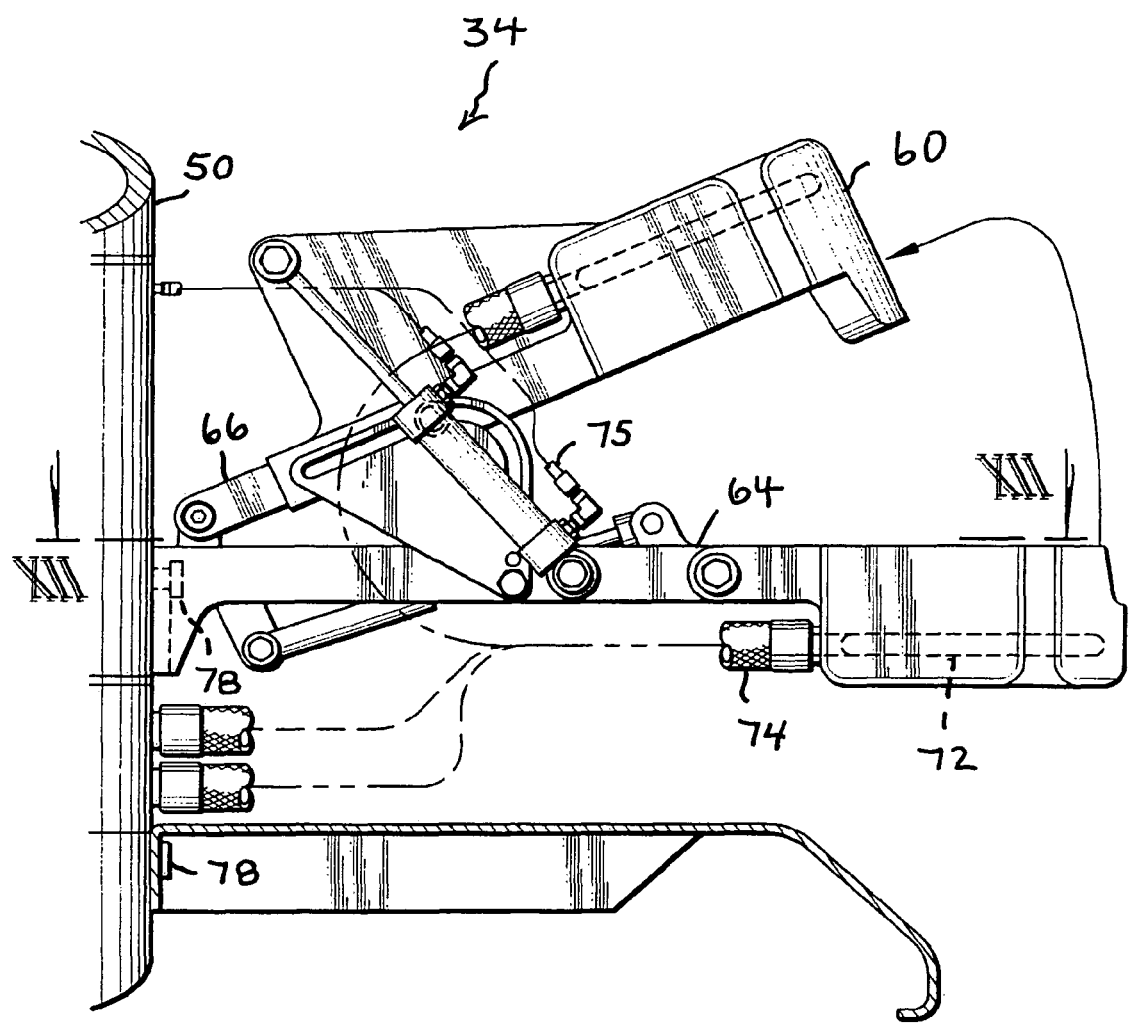
FIG. 10 is a section view comparable to FIG. 9 except showing the lid UP.

FIG. 10 is a section view comparable to FIG. 9 except showing the clamshell cart 60's upper shell retracted BACK and UP. It moves this far BACK in order to admit product 41 from the overhead (eg., marination) cell to the level hereof (eg., the form-and-cook cell 34 in this instance), wherein product 41 drops straight down from the overhead cell and thereafter into one of the bottom (pan) shell's two product-receiving wells 62.

Figure 11:
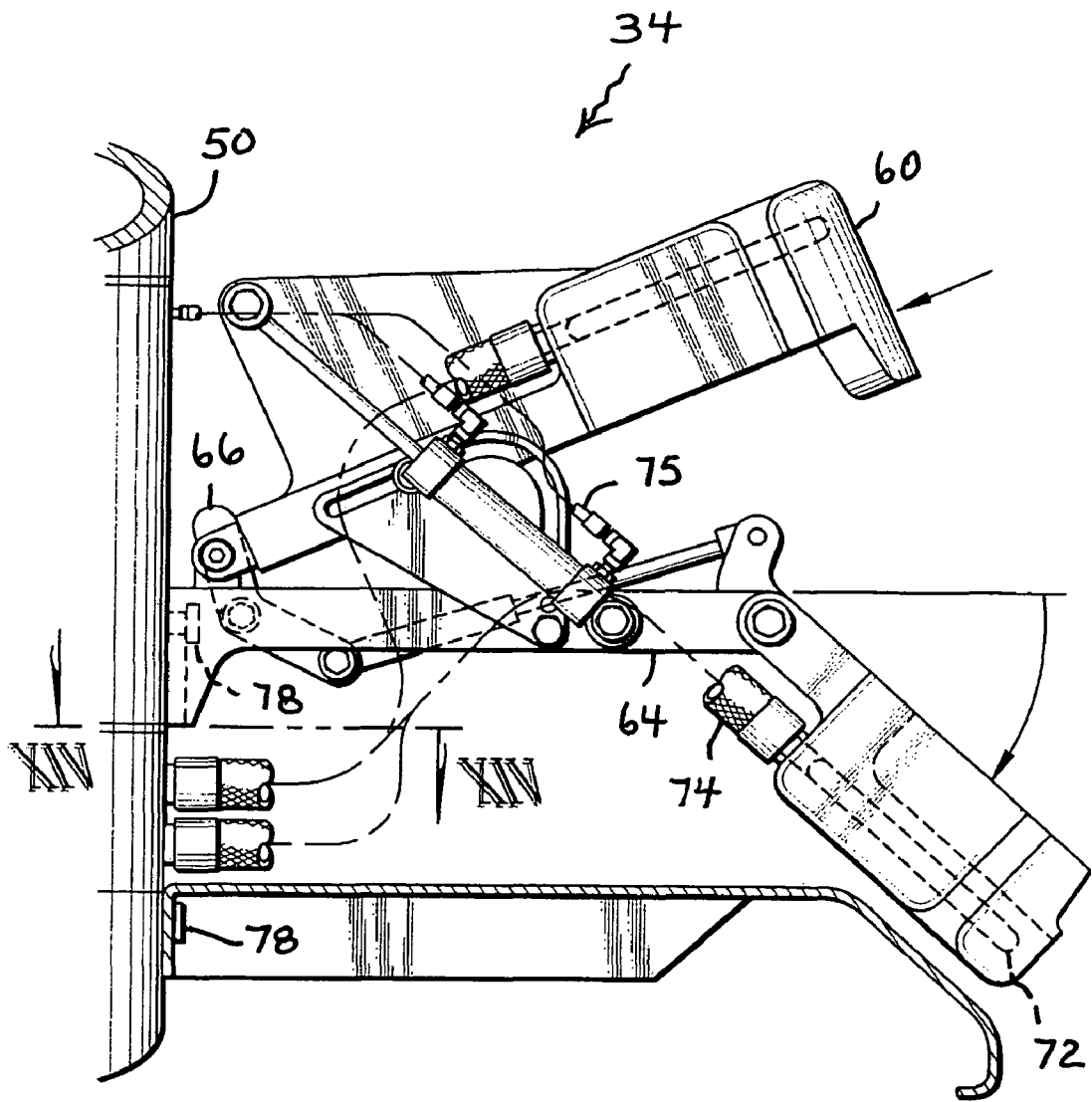
FIG. 11 is likewise comparable to FIG. 10 except showing the pan DOWN.

FIG. 11 is comparable to FIGS. 9 and 10 except also showing bottom shell dropped or tipped DOWN. It moves this far DOWN in order to discharge product 41 from the level hereof (eg., the $2^{nd}$ cell) to the next lower level (eg., the $3^{rd}$ cell), wherein the formed-and-cooked product 41 merely slides out. Optionally, the clamshell carts 60 for the forming-cooking operations here might also be configured to burn in simulative grill marks (this is not shown).

FIG. 12 is a top plan view taken in direction of arrows XII-XII in FIG. 10. Alternatively, FIG. 12 might be reckoned as a top plan view of the clamshell cart 60's bottom shell, and shows the network of interior channels 72 therein for circulation of a thermal medium. The network of interior channels 72 are connected by flexible hoses 74 for utilities for the thermal medium. It is preferred if this $2^{nd}$ cell 34 performs form and cook operations. In that event, the thermal medium is something hot, including any of oil, vapor, or flue gas and the like.

Alternatively, this form-and-cook cell 34 can be easily converted to performing form and chill (or form and freeze) operations by changing the thermal medium to be that of a chilling or freezing medium, including any of liquid coolant, a refrigerant or other vapor (eg., cryogenics), a gas (eg., cryogenics or vortex-generated cold gas), and so on.

Regardless if hot or cold, the thermal medium requires circulation in a loop that in part flows through the clamshell cart 60 but in other part returns to and is sent back again from a utility package (eg., a pumped heat-exchanger or condenser-compressor). Presumptively this utility package is located outside of the tower 31, and is fixed also, in the sense that the utility package does not rotate with the central spindle 40. Just like the thermal medium, the hydraulic fluid which powers the clamshell-cart 60's linkages 66 also preferably need to be linked up by transmission lines 75 to a hydraulic pump outside the tower 31. As an aside, pneumatics are not excluded, it's just that hydraulics are preferred. To turn back to FIG. 1, it indeed shows that various utility packages like the foregoing are located outside of the tower 31. Nevertheless, the service connections to the form-and-cook cell 34 (or whatever other cell may be in need of such) can be arranged inside the tower 31, as shown better by FIG. 14.

FIG. 14 is a section view taken along line XIV-XIV in FIG. 11. Alternatively, FIG. 14 might be reckoned as a section view through the coaxial assembly for the tower 31 that comprises the central spindle 40 surrounded by the spaced hub 50. The central spindle 40 from its top to bottom is driven in rotation. In contrast, each cell provides a section of the surrounding hub 50. In that case, the spaced hub 50 might be fixed, or rotational with the central spindle 40, or driven to rotate at a speed differing from the central spindle 40. In FIG. 14, this section of the hub 50 for the form-and-cook cell 34 is rotating in unison with the central spindle 40. Between the central spindle 40 and spaced hub 50 is an annular raceway for the extension of transmission lines 76. These transmission lines 76 might be hard or flexible, and thermally-insulated or not. FIGS. 8, 9, 10 and 11 among others show the connecting lines 74 and 75 between nipples on the hub 50's exterior surface to the clamshell cart 60 and/or its linkages 66. FIG. 14 shows the distribution of the transmission lines 76 in service thereof as arranged inside the hub 50.

FIG. 13 is a section view taken along line XIII-XIII in FIG. 9 wherein FIGS. 9 and 13 show that the rotating outer surface of the hub 50 is populated with pairs of mushroom-headed buttons 78 upon which the spars 64 for cantilevering the clamshell carts 60 are hung at inner brackets for such spars 64. It is an aspect of the invention to provide an interchangeable assortment of trays or holders for carrying food product 41 (none other than the clamshell carts 60 are shown for the form-and-cook cell 34). In addition, it is an aspect of the invention to allow swapping out the illustrated clamshell carts 60 for others (not shown) which form product into a different shape than circular patties. Accordingly, the mushroom-headed buttons 78 afford users opportunity to quickly disconnect out one set of product holders and replace with a substitute set.

Figure 15:
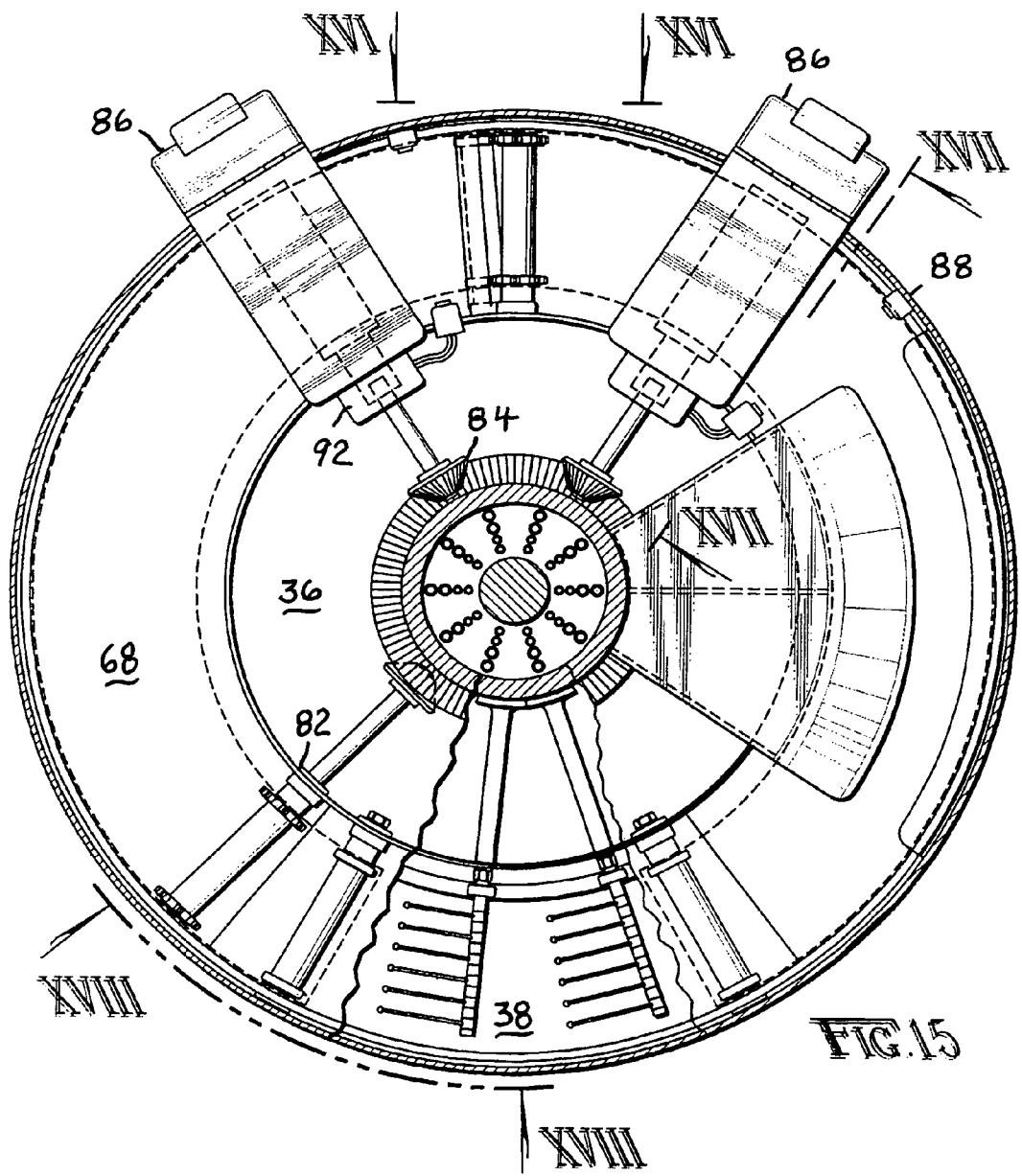
FIG. 15 is a scaled up section view taken along line XV-XV in FIG. 1.

FIG. 15 is a section view taken along line XV-XV in FIG. 1, and comprises the level (eg., the $3^{rd}$ cell here) where coating operations are carried out. FIG. 15 also peers into the $4^{th}$ cell 38, a fry bath, as in view between the about 5:30 to 6:30 position (eg., this being in reference to an imaginary clock dial). The slide ramp earlier shown by FIG. 9 is shown here in FIG. 15 as flaring out like a fantail between two o'clock and four o'clock. The circular conveyor 68 has an upper, product-carrying run that begins at a nose roller at five o'clock, and transits in along an arc circuit until it reaches a tail roller 82 at seven o'clock, after which a return run of the conveyor 68 takes the same circuit back in reverse, as spaced just under the upper product-carrying run. Hence the product-carrying run travels counter-clockwise, the return run clockwise. FIG. 15 also shows ring-and-pinion gear drives 84 for two box stations 86 as well as a third ring-and-pinion drive 84 for the tail roller 82, which is configured with a drive sprocket for driving the conveyor 68. The ring bevel gear is fixed on the hub 50's outer surface and hence rotates in unison with the central spindle 40. The drive shafts do not orbit about the (imaginary) clock dial, but the drive shafts do spin about each's own longitudinal axis. The spin rates can all be different according to the selected sizes of the pinions.

Each box station 86 is configured for a coating operation (eg., dust-coat, batter-coat, or crumb-coat). In this example, each box station 86 is only applying a topcoat of a dry coating. Light sensors 88 or trip-LED's activate the box stations 86 as product 41 travels underneath. Each box station 86 has a magnetic clutch 92 to disengage the operation in the absence of product, and engage operation for a pre-selected lapse of time upon detection of product 41. The box stations 86 are stationary, or at least not orbiting the central spindle 40. And as such, electric lines can be run thereto from outside of the tower 31. Each ring-and-pinon drive 84 merely supplies a rotating drive shaft. The magnetic clutch 92 then activates the rotation in the box station 86 only when product 41 flows underneath. Hence such a coating cell 36 can have multiple box stations 86 doing multiple things, including batter-coating and so on. That is, the zone from ten o'clock to seven o'clock could be utilized for further operations, including without limitation a batter-coating or the like.

Another way to achieve batter coating in particular is to employ clamshell-type carts as described above in connection with the form-and-cook cell 34. A bottom coat of batter is deposited on the bottom of the pan before product is introduced (this is not shown). Introduction of product causes it to acquire at least a bottom coat. Then the clamshell cart can be closed and an injection of a top coat can take place. By the foregoing, a batter coat is deposited on top and bottom, and presumably all sides as well, of the food product.

Figure 16:
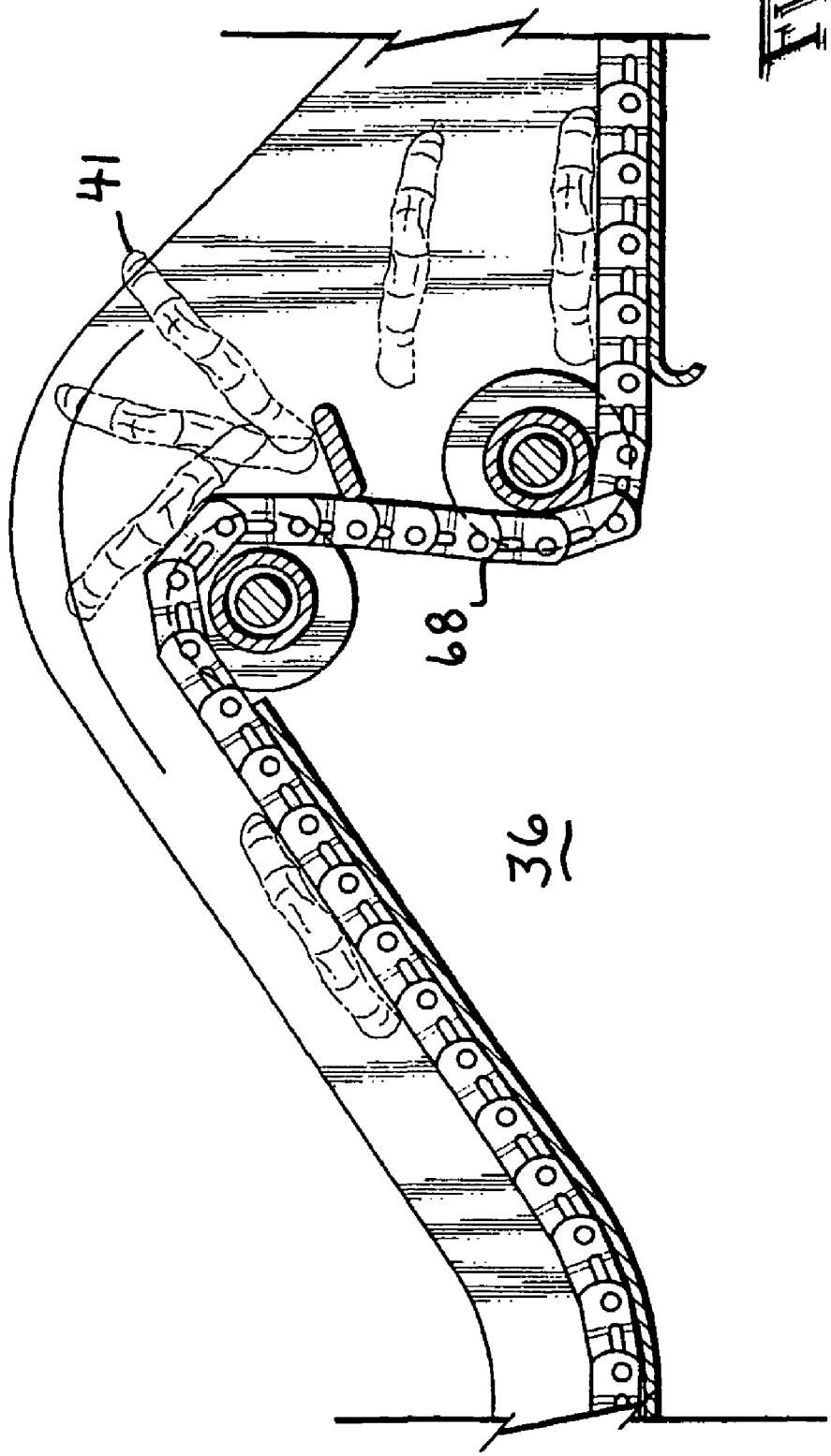
FIG. 16 is a scaled up elevation view in direction of FIG. 15's arrows XVI-XVI.
Figure 17:
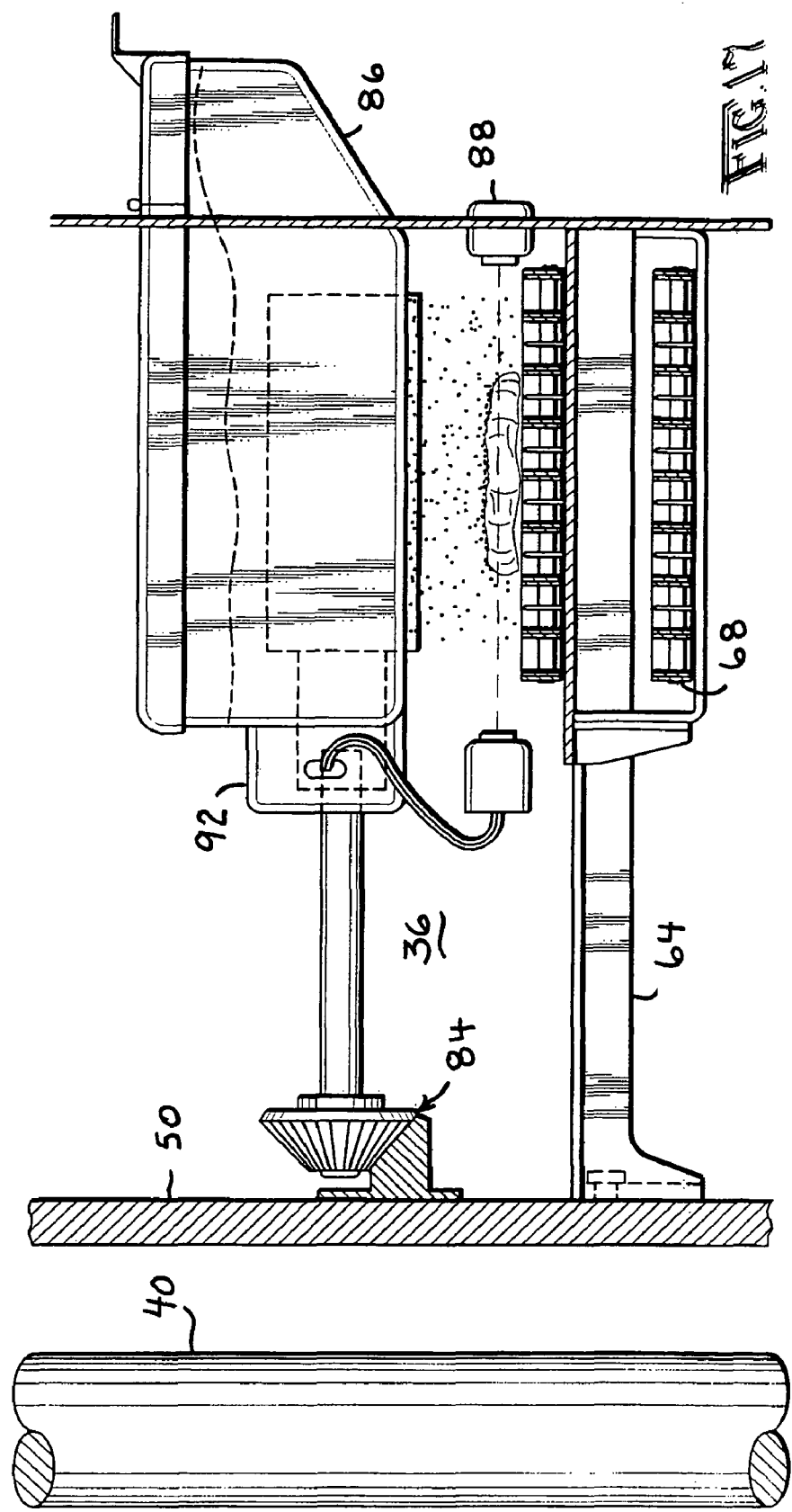
FIG. 17 is a scaled up section view taken along line XVII-XVII in FIG. 15.

FIG. 16 is an elevation view in direction of arrows XVI-XVI in FIG. 15, and shows and shows a shake and flip operation. Batter, if any, ought to hang on. FIG. 17 is a section view taken along line XVII-XVII in FIG. 15, and shows product 41 being top-coated with a coating material on what was previously the underside of the product 41 (again, the product 41 has been flipped as shown in FIG. 16). Re-charging the box stations 86 with coating material can be accomplished from outside the tower 31, since as said above the box stations 86 do not orbit the central spindle 40.

Figure 18:
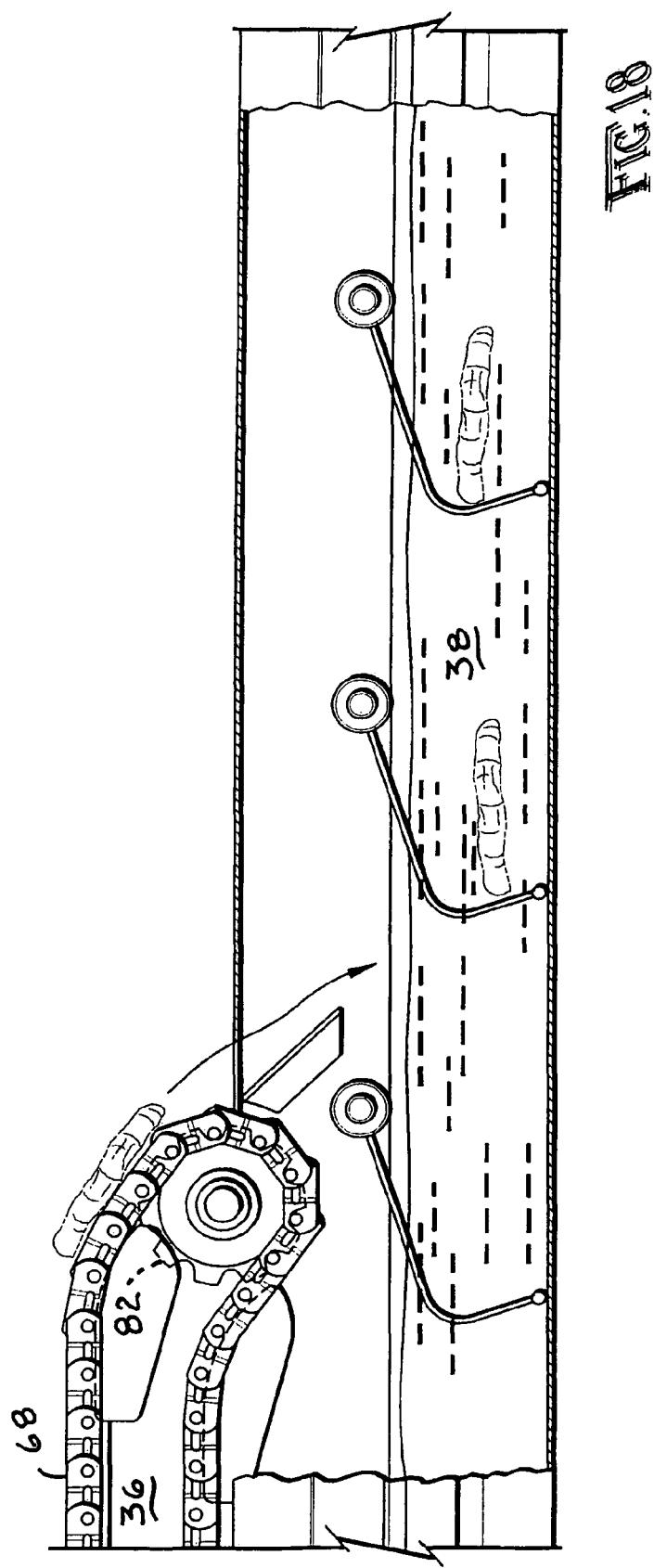
FIG. 18 is a scaled up elevation view taken along line XVIII-XVIII in FIG. 15.

FIG. 18 is an elevation view taken in the direction of arrows XVIII-XVIII in FIG. 15, and shows product 41 reaching the end of the coating cell 36 level (eg., the $3^{rd}$ cell), and being dropped into the next lower level (eg., the $4^{th}$ cell 38), comprising fry operations. While nearing the end of the path on the $3^{rd}$ cell, the product-carrying run of the chain (or mesh) conveyor 68 reaches the tail roller 82, and the return run therefor reverses course around tail roller 82. Product might be fed between upper and lower compression belts for forming and or searing (eg., grill-mark applying) operations, although this is not shown.

The fry bath of the fry cell 38 includes many of the same aspects as the marinade bath for the marination cell 32. The fry bath comprises a bath, with spokes, rollers riding on a cam ring, and fingers pulled by abbreviated shafts pushing (and submerging) product 41 along in fry bath. The fry bath is of course charged not with marinade but heated cooking oil. The cooking oil is circulated by a pumped heat-exchanger outside of the tower 31 (not shown) and connected by transmission lines also on the outside of the fry bath. Since the fry bath does not rotate, the transmission lines therefor do not need to be routed between the spindle 40 and hub 50 as shown in connection with the form-and-cook cell 34 (eg., the $2^{nd}$ cell herein).

Figure 19:
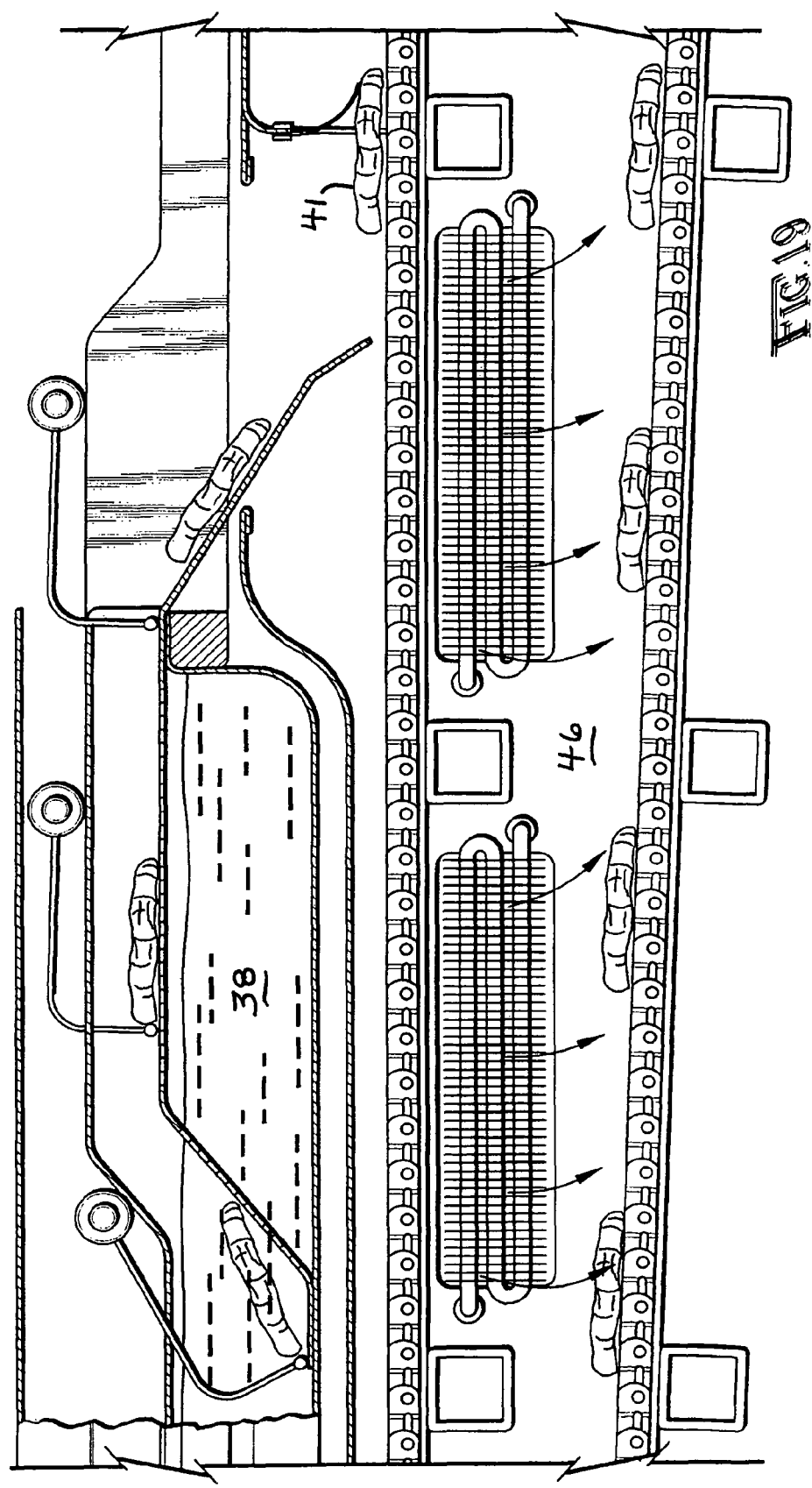
FIG. 19 is an elevational view comparable to FIG. 16 or 18 except showing inter-cell transfer of food product from a fry bath to a spiral freezer.

FIG. 19 is an elevational view comparable to FIG. 16 or 18 except showing the end of the food product's transit through the fry bath and then such product's subsequent deposit into a freezer compartment 46. In FIG. 19, product 41 exits the fry bath by climbing a perforated ramp for draining off excess cooking oil. As can be reckoned by turning back to FIG. 1, the freezer compartment 46 outputs product 41 to a package area 44. Product 41 is carried through the freezer compartment 46 by means of a helical conveyor. Hence the freezer compartment 46 does not rotate. Only the helical conveyor is moving in the freezer compartment 46, and it serpentines around in the manner of a helical conveyor as is known. The thermal medium for the freezer compartment 46 is supplied from the outside the tower 31. Again, reference back to FIG. 1 shows that utility packages such as a refrigeration unit, air blower and the main drive motor as well are preferably situated outside of the tower 31.

Figure 20:
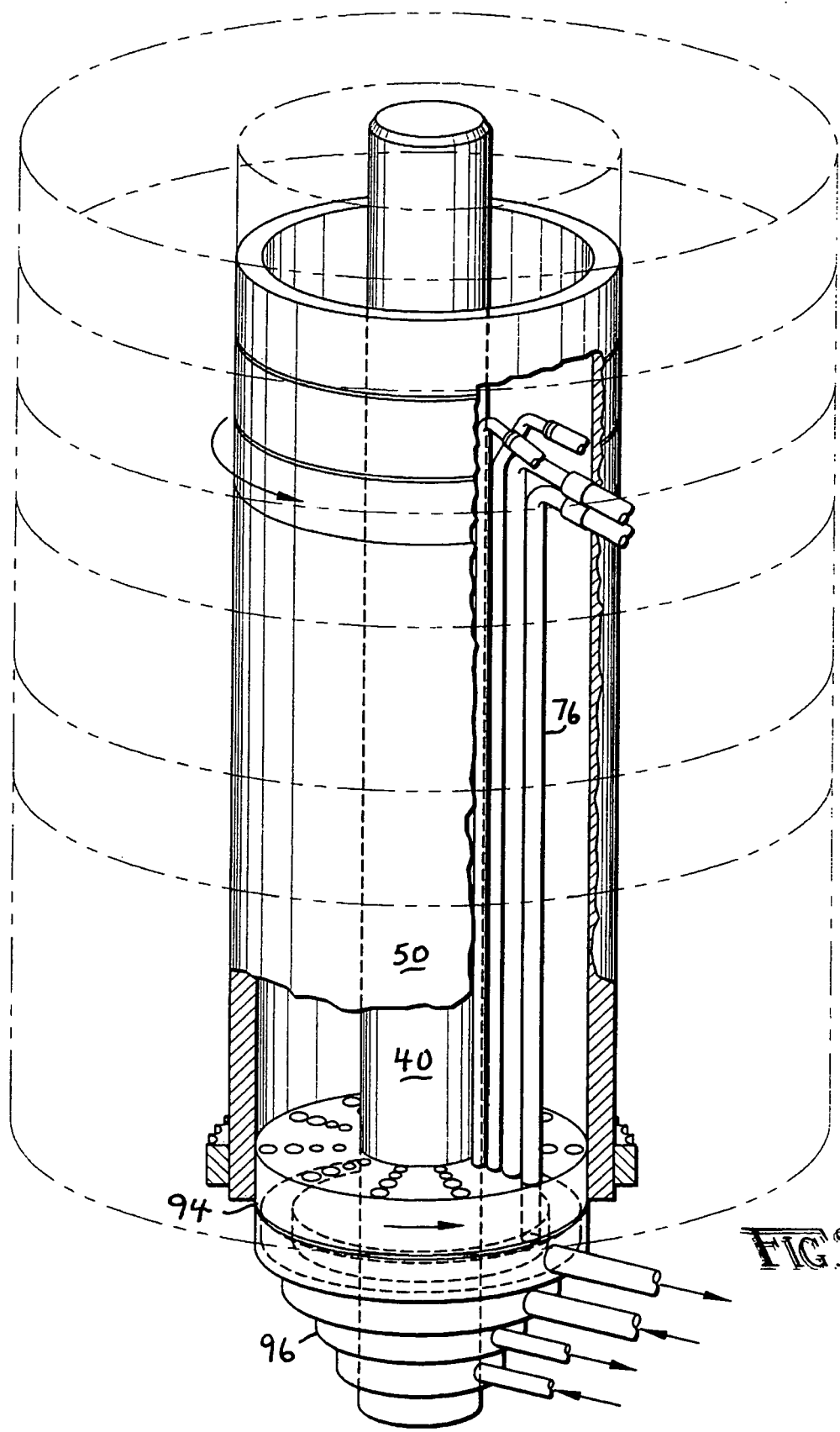
FIG. 20 is a scaled up perspective view comparable to FIG. 1 except with outer portions removed from view and other portions broken away to reveal a central axle, a hub therefor, and an arrangement of transmission lines for serving cells with utilities.

FIG. 20 is a view that is comparable to FIG. 1 except with most of the outer layers peeled to reveal the central axle, portions of the hub 50, and an exemplary arrangement of interior transmission lines 76 for servicing selected cells with utilities. These interior transmission lines 76 spring out of a carousel manifold 94 that rests on top of a rotational seal 96 that is multiply coaxial as necessary to transition the fluids and materials carried inside the transmission lines 76 from fixed supply-and-return lines external to the tower 31.

Accordingly, it is a preferred aspect of the invention if various sub-processes are completed in cellular levels or horizontal zones so that combinations thereof can be stacked vertically. Preferably each cell is provided with its own conveying apparatus so that individual pieces of product, perhaps in individual holders, are motivated in a circuit from an origin to a termination. The geometry might be without limitation circular circuits as shown, but this does not exclude frames of any geometry, nor else a linear geometry, like rungs on a ladder (not shown). But again, a preferred geometry is circular. That way, preferably the termination is angularly spaced from the origin by 350° or so. The inner perimeter of any cell's circuit affords space for placing drive, control and delivery systems. Alternatively or in addition, any such cell may work best if coupled with a base, in which event the base affords further opportunity for locating drive, control, and/or delivery systems.

Hence each cell preferably defines a circuit in the form of a track. The track will impose an orderly path for the food product that makes something less than a full lap around the track. In certain cells, it is desired if individual holders or carts do the actual carrying of food product including, if moreover desired, individual pieces of food product. At the termination (eg., at 350° or so), such holders or carts preferably execute a discharge procedure in order to deliver its content(s) onto a lower level for a different process in the procession.

As mentioned previously, it is conventional nowadays for a prior art straight-line food process line to be built with separate machines linked together to perform a chain of events. A typical prior art straight line that would be as simple as pre-dust, batter, bread and fry might measure thirty to fifty feet (9 to 15 m) or more in length. One advantage of the invention, among numerous others, is that it renders such length needless because the system is constructed on a circuit principle, with the separate circuits coupled to each other by stacking, eg., layer cake style. For example, a single circuit (ie., cell), if circular, has a ten foot (3 m) diameter, and this corresponds to thirty feet (9 m) of straight-line length. Consequently, the cellularly-integrated food process line 30 in accordance with the invention affords a more compact footprint, in terms of finding floor space for it.

The inventor hereof is the sole or joint inventor of the next-listed U.S. patents and/or U.S. patent applications, the disclosures of which are incorporated herein in full by this references thereto:

U.S. Pat. No. 6,158,332—Convertible Drum-type Coating Apparatus;
U.S. Pat. No. 6,305,274—Fryer for Food Process Lines;
U.S. Pat. No. 6,512,810 (B2)—Convertible Combination Batter Mixer and Applicator Machine;
U.S. patent application Ser. No. 10/339,175—Spiral Freezer, Refrigeration Delivery, Enclosure and Drive; and,
U.S. patent application Ser. No. 10/339,176—Spiral Oven, Heat Delivery, Enclosure and Drive.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A compact cellular food process line comprising:
a plurality of diverse cells (32,34,36,38), each including conveying apparatus (56,60,68) extending between an infeed zone for introduced food product and a discharge zone to where the introduced food product (41) is conveyed along a pathway therefor and discharged therefrom, wherein each cell further includes process apparatus (32,62,72,86,38) for interacting with the food product along the pathway thereof to achieve at least one sub-process comprising any of marinade, form, cook, dust coat, batter coat, crumb coat, fry, sear, or freeze;
at least a first and a second of such cells which are diverse according to the process apparatus thereof being combined in a vertical stack such that the pathway of the second cell generally courses under the pathway of the first cell;
an inter-cell transfer provision (52,54,56,60,64,66,68,82) for introducing food product discharged by one cell to a succeeding cell;
wherein any cell of said vertical stack is interchangeable with a third cell for said stack that is diverse according to the process apparatus of the swapped-out cell.

2. The compact cellular food process line of claim 1 wherein the food product discharged by any relatively upper cell in said stack is introduced to the immediately lower cell.

3. The compact cellular food process line of claim 1 further comprising the third of such cells, diverse according to the process apparatus of the others, which is combined in the vertical stack such that the pathway of the third cell generally courses under the pathway of the second cell.

4. The compact cellular food process line of claim 1 wherein the conveying apparatus of at least one of said cells of said vertical stack comprises a train of carts (60) having one or more wells, wherein each well has a capacity for one individual piece of food product only.

5. The compact cellular food process line of claim 1 wherein each cell's pathway traces a lap or portions thereof about a circuit in a horizontal plane.

6. The compact cellular food process line of claim 1 wherein each cell's pathway traces a circle or circular arc about a vertical central axis.

7. The compact cellular food process line of claim 1 further comprising a driven vertical (40,50), wherein the conveying apparatus of at least one of said cells of said vertical stack is coupled (58,78,84) to said vertical axle for drive power.

8. The compact cellular food process line of claim 1 wherein one of said diverse cells comprises process apparatus for forming with either a sub-process of cooking or freezing and which is achieved by way of the conveying apparatus therefor comprising a train of clamshell carts (60) serviced by a power utility to be individually operative between open and shut extremes, such that the shut extreme applies a compressive force to achieve product-forming work, and each clamshell cart being serviced by thermal utilities comprising either a source of heat or a source of cooling; wherein said power and thermal utilities include transmission lines (76) extending from transitional-couplers (94, 96) adapted to link the transmission lines (74,75) for the traveling carts with fixed sources of power or thermal services.

9. The compact cellular food process line of claim 1 wherein the inter-cell transfer provision comprises an arrangement with the discharge zone of each relatively upper cell in cooperation with the infeed zone of the immediately lower cell such that discharged food just drops into the infeed zone of the immediately lower cell.

10. The compact cellular food process line of claim 1 wherein the inter-cell transfer provision comprises an arrangement with the discharge zone of each relatively upper cell in cooperation with the infeed zone of the immediately lower cell such that discharged food just drops into the infeed zone of the immediately lower cell or, with the inter-cell transfer provision further comprising a ramp (eg., 54), slides down the ramp thereto.

* * * * *